United States Patent
Boudreau et al.

(10) Patent No.: US 8,014,796 B2
(45) Date of Patent: Sep. 6, 2011

(54) MAP VERSION CONTROL METHODS AND APPARATUS FOR UPDATING THE USE OF NETWORK-MAINTAINED MAP DATA SETS FOR MOBILE COMMUNICATION DEVICES

(75) Inventors: Jesse Jospeh Boudreau, Ottawa (CA); Eric Johnson, Ottawa (CA); Gerhard Dietrich Klassen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 834 days.

(21) Appl. No.: 11/483,123

(22) Filed: Jul. 7, 2006

(65) Prior Publication Data

US 2007/0229490 A1    Oct. 4, 2007

Related U.S. Application Data

(60) Provisional application No. 60/788,421, filed on Mar. 31, 2006, provisional application No. 60/787,541, filed on Mar. 31, 2006.

(51) Int. Cl.
*H04W 24/00* (2009.01)
*G01C 21/30* (2006.01)

(52) U.S. Cl. ............. 455/457; 455/566; 340/995.1; 701/208

(58) Field of Classification Search .......... 455/457, 455/566
See application file for complete search history.

(56) References Cited

U.S. PATENT DOCUMENTS

| | | | |
|---|---|---|---|
| 5,559,938 A | 9/1996 | Van Roekel et al. | |
| 6,230,098 B1 * | 5/2001 | Ando et al. | 701/208 |
| 6,240,360 B1 | 5/2001 | Phelan | |
| 6,282,492 B1 * | 8/2001 | Gorai et al. | 701/209 |
| 6,330,453 B1 * | 12/2001 | Suzuki et al. | 455/457 |
| 6,473,099 B1 * | 10/2002 | Goldman et al. | 715/749 |
| 6,546,334 B1 * | 4/2003 | Fukuchi et al. | 701/208 |

(Continued)

FOREIGN PATENT DOCUMENTS

EP    0875729 A2    4/1998

(Continued)

OTHER PUBLICATIONS

European Search Report for Application # 06116851.4 Dated Oct. 3, 2006.

(Continued)

*Primary Examiner* — Lester Kincaid
*Assistant Examiner* — Steven Kelley
(74) *Attorney, Agent, or Firm* — John J. Oskorep, Esq.

(57) ABSTRACT

A map version control method of providing updates of network-maintained map data sets in mobile communication devices includes the steps of receiving a version of map data from a network database through a wireless communication network; causing the map to be visually displayed in a display in accordance with the version of the map data; maintaining storage of the version of the map data in a cache; receiving, through the wireless communication network, an indication indicating that an alternative or updated version of the map data corresponding to the map is available in the network database. The map corresponding to the alternative version of the map data may include one or more map objects that are unavailable in the map of the other version or an appearance that is different from the appearance of the map of the other version, where the map data may be obtained from a plurality of different network databases.

22 Claims, 13 Drawing Sheets

U.S. PATENT DOCUMENTS

| | | | |
|---|---|---|---|
| 6,728,635 B2 | 4/2004 | Sakamoto et al. | |
| 6,823,255 B2 | 11/2004 | Ahrens et al. | |
| 6,853,911 B1* | 2/2005 | Sakarya | 701/208 |
| 6,980,907 B2* | 12/2005 | Umezu et al. | 701/210 |
| 6,983,203 B1 | 1/2006 | Wako | |
| 6,993,350 B2* | 1/2006 | Katoh | 455/457 |
| 7,065,348 B1* | 6/2006 | Aoki | 455/419 |
| 7,082,443 B1* | 7/2006 | Ashby | 1/1 |
| 7,099,882 B2* | 8/2006 | McDonough | 1/1 |
| 7,317,986 B2* | 1/2008 | Kim | 701/214 |
| 7,383,316 B2* | 6/2008 | Koch et al. | 709/217 |
| 7,395,150 B2* | 7/2008 | Ohira et al. | 701/208 |
| 7,403,851 B2* | 7/2008 | Kaufman et al. | 701/200 |
| 7,428,460 B2* | 9/2008 | Atarashi et al. | 701/208 |
| 7,584,049 B2* | 9/2009 | Nomura | 701/210 |
| 7,610,147 B2* | 10/2009 | Umezu et al. | 701/208 |
| 7,698,060 B2* | 4/2010 | Nomura | 701/208 |
| 7,890,257 B2* | 2/2011 | Fyke et al. | 701/208 |
| 7,904,241 B2* | 3/2011 | Coch et al. | 701/208 |
| 2002/0041328 A1 | 4/2002 | LeCompte et al. | |
| 2002/0077094 A1* | 6/2002 | Leppanen | 455/420 |
| 2002/0174360 A1 | 11/2002 | Ikeda | |
| 2003/0100316 A1* | 5/2003 | Odamura | 455/456 |
| 2004/0030490 A1* | 2/2004 | Hegedus et al. | 701/200 |
| 2004/0030493 A1 | 2/2004 | Pechatnikov et al. | |
| 2004/0209601 A1 | 10/2004 | Obradovich et al. | |
| 2005/0114021 A1* | 5/2005 | Krull et al. | 701/211 |
| 2007/0178915 A1* | 8/2007 | Khan | 455/457 |
| 2008/0082262 A1 | 4/2008 | Silva et al. | |
| 2009/0055774 A1 | 2/2009 | Joachim | |

FOREIGN PATENT DOCUMENTS

| | | |
|---|---|---|
| EP | 0908835 A2 | 4/1999 |
| EP | 1464922 A1 | 10/2004 |
| EP | 1477911 A1 | 11/2004 |
| EP | 1710713 A1 | 10/2006 |
| JP | 2005301196 | 10/2005 |
| WO | 8602764 A1 | 5/1986 |
| WO | 9707467 A1 | 2/1997 |
| WO | 0127812 A2 | 4/2001 |
| WO | 0165518 A2 | 9/2001 |
| WO | 03087725 A2 | 10/2003 |
| WO | 2004076977 A1 | 9/2004 |

OTHER PUBLICATIONS

European Search Report and Written Opinion for EP application 06116851.4, Dated Oct. 17, 2006.

* cited by examiner

FIG. 1
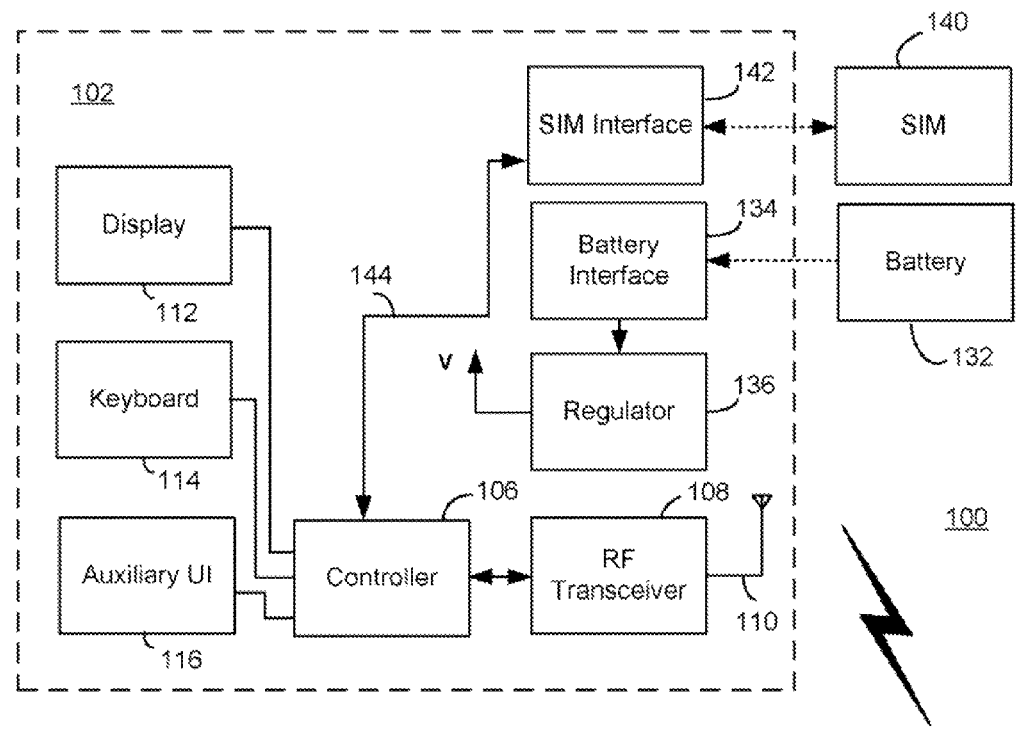
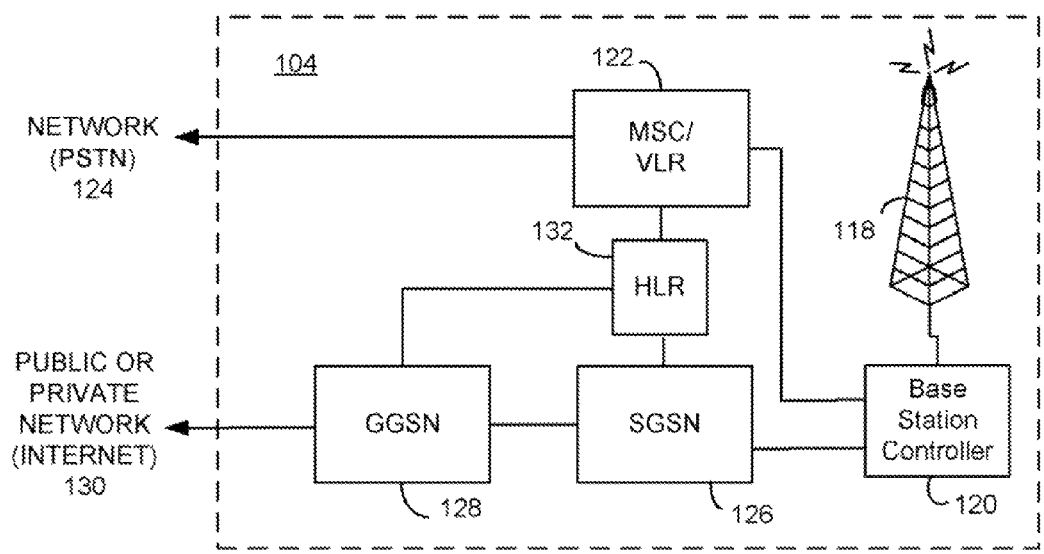

FIG. 8

| Address View |
|---|
| Rich Peillard — 802<br>Company: Company, Inc.<br>Title:<br>Email: rpeillard@company.com — 810 |
| PIN: xxxxxxxx<br>Work: +1-312-555-1212 — 804<br>Home: +1-312-555-1213 — 805 |
| Work Address:<br>1000 N. Lake Shore Drive — 806<br>Chicago, Illinois 60666 USA |
| Home Address:<br>450 March Road — 808<br>Kanata, Ontario Canada |

800

US 8,014,796 B2

MAP VERSION CONTROL METHODS AND APPARATUS FOR UPDATING THE USE OF NETWORK-MAINTAINED MAP DATA SETS FOR MOBILE COMMUNICATION DEVICES

CROSS-REFERENCE TO RELATED APPLICATIONS

This application claims priority to a U.S. provisional patent application of the same title having Ser. No. 60/788,421, and filing date of 31 Mar. 2006, and to a U.S. provisional patent application entitled "Method And System For Distribution Of Map Content To Mobile Communication Devices" having Ser. No. 60/787,541, lead inventor Eric Johnson, and a filing date of 31 Mar. 2006.

BACKGROUND

1. Field of the Technology

The present disclosure relates generally to map version control techniques for updating the use of network-maintained map data sets for mobile communication devices operating in wireless communication networks.

2. Description of the Related Art

Mapping techniques may utilize network-maintained map data sets stored in a network database and managed by one or more network servers for mobile communication devices. Initially, a mobile communication device must request and retrieve the map data from the network database over the wireless communication network and store the map data in a memory cache. The processor subsequently utilizes the map data in its cache to render maps in the visual display of the device. Subsequently, any map data not found within the cache (typically the case when the location or region of the map substantially changes) needs to be similarly requested and retrieved from the network database.

However, the network database may be updated over time with one or more different versions of map data. This updating may be performed regularly over time when new or alternative map information is made available; the updates may be important corrections to errors or updated visual or textual features.

If an alternative version of the map data is made available to all mobile communication devices in the wireless communication network at substantially the same time, and the alternative version replaces the previous version in the network database, then the mobile communication devices may render maps which are visually inconsistent due to the inconsistencies between the previous version of map data in its cache and the updates it receives. If the alternative version of the map data is made available and required to be utilized in full by the mobile communication devices (i.e. full download to replace all map data in its cache), then the wireless communication network would be overburdened with high volumes of map data traffic at the same time. Also, a mobile communication device would perhaps be unwittingly utilizing bandwidth that it might not have wanted to utilize, and may undesirably require the end user of the device to bear the costs of the extra bandwidth usage.

Accordingly, there is a need for map version control methods and apparatus for updating the use of network-maintained map data sets, especially for use in mobile communication devices which operate in wireless communication networks.

BRIEF DESCRIPTION OF THE DRAWINGS

Embodiments of present invention will now be described by way of example with reference to attached figures, wherein:

FIG. 1 is a block diagram which illustrates pertinent components of a mobile communication device and a wireless communication network of a communication system;

FIG. 8 is an illustration of information which may be displayed in a visual display of the mobile communication device, the information being an address book contact of an address book of the mobile communication device;

DETAILED DESCRIPTION OF THE PREFERRED EMBODIMENTS

Figure 2:
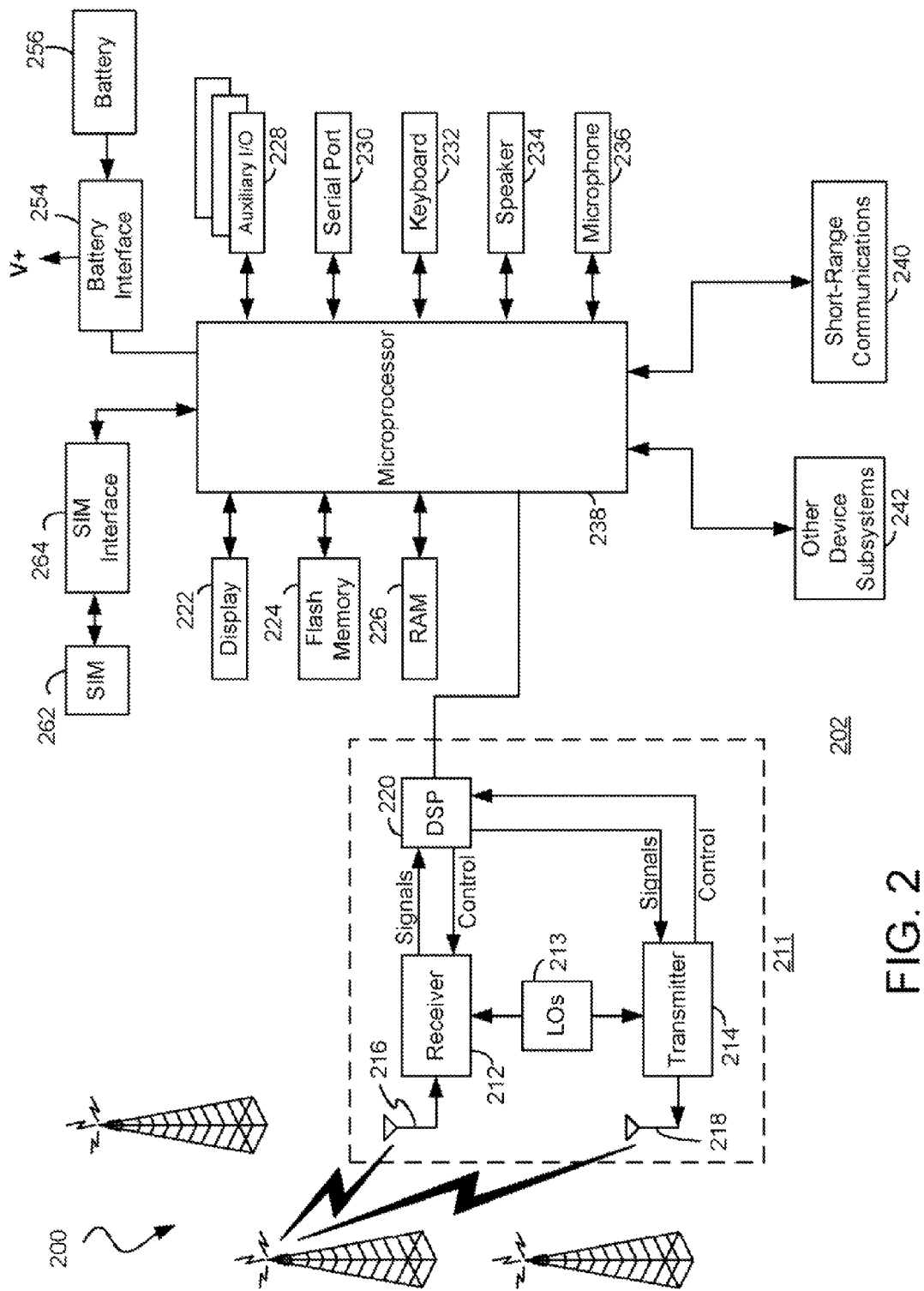
FIG. 2 is a more detailed diagram of a preferred mobile communication device of FIG. 1, namely, a mobile station.

Version control methods and apparatus for updating the use of network-maintained map data sets for mobile communication devices are described herein. An illustrative method for a mobile communication device may include the steps of receiving a version of map data from a network database through a wireless communication network; causing the map to be visually displayed in a display in accordance with the version of the map data; maintaining storage of the version of the map data in a cache; receiving, through the wireless communication network, an indication indicating that an alternative or updated version of the map data corresponding to the map is available in the network database; identifying, at the mobile communication device, one of an acceptance and a declination of the alternative version of the map data; if the acceptance is identified: causing one or more requests for the alternative version of the map data to be sent through the wireless communication network, receiving the alternative version of the map data through the wireless communication network in response to the one or more requests, and causing the map to be visually displayed in the display in accordance with the alternative version of the map data; and if the declination is identified: refraining from causing one or more requests for the alternative version of the map data to be sent through the wireless communication network and continuing to cause the map to be visually displayed in the display in accordance with the version of the map data. The map corresponding to the alternative version of the map data may include one or more map objects that are unavailable in the map of the other version or an appearance that is different from the appearance of the map of the other version, as examples.

Further, an illustrative method for a network mapping server may include the steps of maintaining storage of a version of map data in one or more network databases; causing the version of map data to be sent from the one or more network databases to a mobile communication device via a wireless communication network, the map data corresponding to a map to be visually displayed in the mobile communication device; maintaining storage of an alternative version of the map data in the one or more network databases while maintaining storage of the version of the map data; causing an indication to be sent to the mobile communication device via the wireless communication network, the indication indicating that the alternative version of the map data corresponding to the map is available; if the mobile communication accepts the alternative version of the map data: receiving one or more requests for the alternative version of the map data via the wireless communication network and causing the alternative version of the map data to be sent to the mobile communication device via the wireless communication network in response to the one or more requests; and if the mobile communication device refrains from accepting the alternative version: refraining from causing the alternative version of the map data to be sent to the mobile communication device via the wireless communication network.

FIG. 1 is a block diagram of a communication system 100 which includes a mobile station 102 (one type of wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and BSC 120, including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 134 provides for a mechanical and electrical connection for battery 132. Battery interface 134 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a Global Positioning System (GPS) unit, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. Wireless communication network 104 may be a cellular telecommunications network. In the embodiment of FIG. 1, wireless network 104 is configured in accordance with Global Systems for Mobile Communications (GSM) and General Packet Radio Service (GPRS) technologies. Although wireless communication network 104 is described herein as a GSM/GPRS type network, any suitable network technologies may be utilized such as Code Division Multiple Access (CDMA), Wideband CDMA (WCDMA), whether 2G, 3G, or Universal Mobile Telecommunication System (UMTS) based technologies. In this embodiment, the GSM/GPRS wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

FIG. 2 is a detailed block diagram of a preferred mobile station 202 of the present disclosure. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as techniques of the present disclosure, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3A:
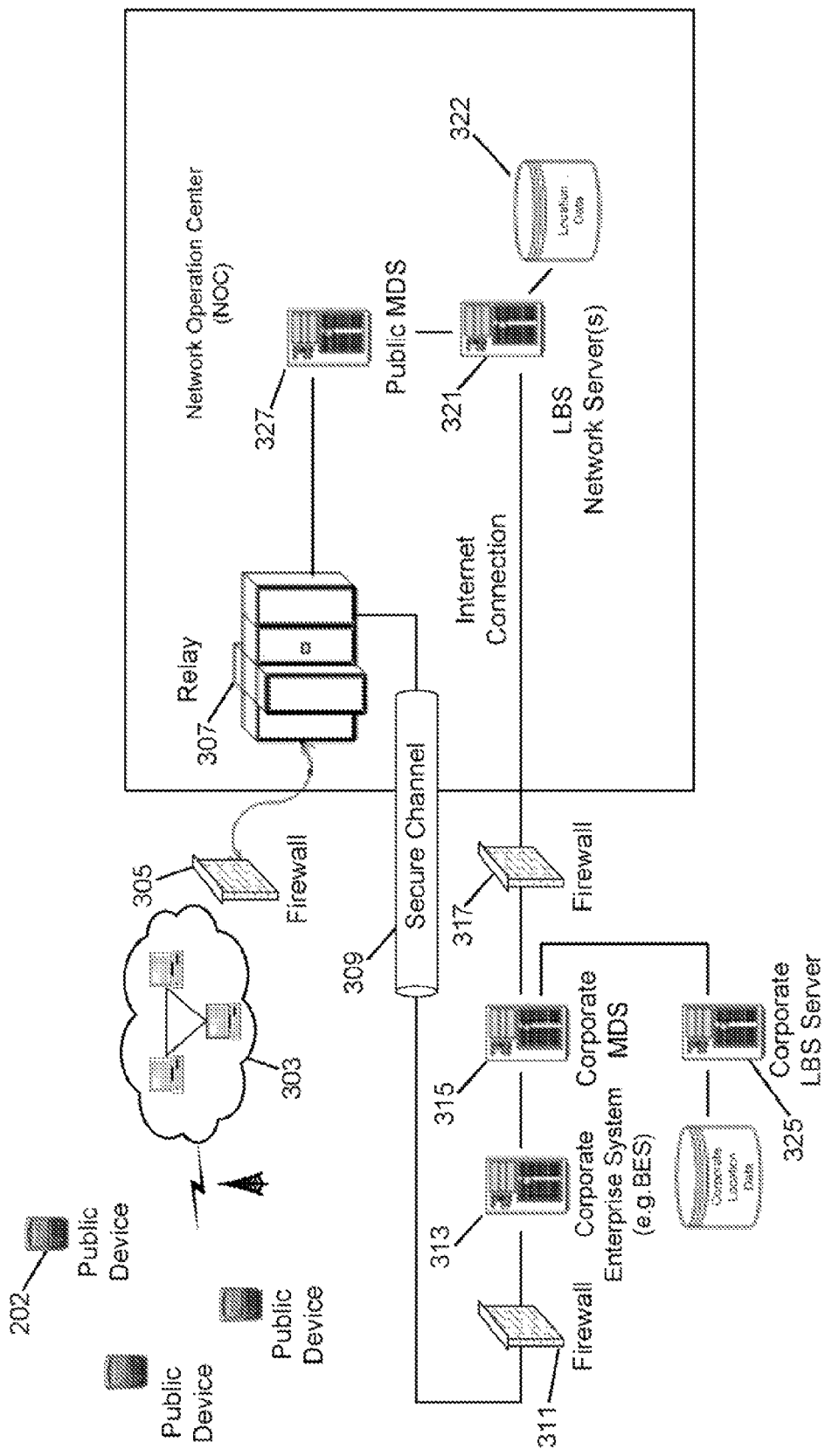
FIG. 3A is a system diagram of network components which provide mapping functionality in the mobile communication devices of FIGS. 1 and 2.

FIG. 3A is a system diagram of network components which provide mapping functionality in the mobile communication devices of FIGS. 1 and 2. To achieve this, a mapping application is also provided in memory of the mobile communication device (e.g. a mapping application 550 of FIG. 5) for rendering of visual maps in its display. Mobile communication devices, such as mobile station 202, are connected over a mobile carrier network 303, for communication through a firewall 305 to a relay 307. A request for map data from any one of the mobile communication devices is received at relay 307 and passed via a secure channel 309 through firewall 311 to a corporate enterprise server 313 and corporate mobile data system (MDS) server 315. The request is then passed via firewall 317 to a public location-based service (LBS) server 321 which provides location-based services (LBS) to handle the request. The network may include a plurality of such LBS servers where requests are distributed and processed through a load distributing server. The LBS data may be stored on this network server 321 in a network database 322, or may be stored on a separate LBS data server (not shown). Private corporate data stored on corporate LBS server 325 may be added to the public data via corporate MDS server 315 on the secure return path to mobile station 202. Alternatively, where no corporate servers provided, the request from mobile station 202 may be passed via relay 307 to a public MDS server 327, which sends the request to public LBS server 321 providing LBS to handle the request.

A Maplet data structure is provided that contains all of the graphic and labeled content associated with a geographic area (e.g. map features such as restaurants (point features), streets (line features), or lakes (polygon features)). Maplets are structured in Layers of "DEntries" (Data Entries) identified by a "Layer ID" to enable data from different sources to be deployed to the device and meshed for proper rendering. Each DEntry is representative of one or more artifact or label (or a combination of both) and includes coordinate information (also referred to a "bounding box" or "bounding area") to identify the area covered by the DEntry and a plurality of data Points that together represent the artifact or label. For example, a DEntry may be used to represent a street on a city map (or a plurality of streets), wherein the various Points within the DEntry are separated into different parts representing various portions of the artifact (e.g. portions of a street). A mobile device may issue a request for the map server to download only those DEntries that are included within a specified area or bounding box representing an area of interest that can be represented by, for example, a pair of bottom left, top right coordinates.

As discussed later below with reference to FIG. 3B, the mobile device issues one or more AOI (Area of Interest) requests, DEntry or data requests and Maplet Index requests to the map server, for selective downloading of map data based on user context Thus, rather than transmitting the entire map data with each request from the device, local caching may be used within the mobile device in conjunction with context filtering of map data on the server. For example, if a user's mobile device is GPS enabled and the user is traveling in an automobile at 120 km/hr along a freeway then context filtering can be employed to prevent downloading of map data relating to passing side streets. Or, if the user is traveling in an airplane at 30,000' then context filtering can be employed to prevent downloading of map data for any streets whatsoever. Also, a user's context can be defined, for example, in terms of occupation (e.g. a user whose occupation is transport truck driver can employ context filtering to prevent downloading of map data for side streets on which the user's truck is incapable of traveling, or a user whose occupation is to replenish supplies of soft drink dispensing machines can employ context filtering to download public map data showing the user's geographical area of responsibility with irrelevant features such as lakes or parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving OTA (Over-the-Air) bandwidth and device memory caching requirements. The Maplet Index conforms to the same data structure as a Maplet, but omits the data Points. Consequently, the Maplet Index is small (e.g. 300-400 bytes) relative to the size of a fully populated Maplet or a conventional bit map, and includes DEntry bounding boxes and attributes (size, complexity, etc.) for all artifacts within the Maplet. As the field of view changes (e.g. for a location-aware device that displays a map while moving), the device (client) software assesses whether or not it needs to download additional data from the server. Thus, as discussed above, if the size attribute or complexity attribute of an artifact that has started to move into the field of view of the device (but is not yet being displayed) is not relevant to the viewer's current context, then the device can choose not to display that portion of the artifact. On the other hand, if the portion of the artifact is appropriate for display then the device accesses its cache to determine whether the DEntries associated with that portion of the artifact have already been downloaded, in which case the cached content is displayed. Otherwise, the device issues a request for the map server to download all of the DEntries associated with the artifact portion.

By organizing the Maplet data structure in Layers, it is possible to seamlessly combine and display information obtained from public and private databases. For example, it is possible for the device to display an office building at a certain address on a street (e.g. $1^{st}$ z-order attribute from public database), adjacent a river (e.g. $2^{nd}$ z-order attribute from public database), with a superimposed floor plan of the building to show individual offices (e.g. $11^{th}$ z-order attribute from a private database, accessible through a firewall).

Referring back to FIG. 3A, within the network having LBS server(s) 321 and database(s) 322 accessible to it, all of the map data for the entire world is divided and stored as a grid according to various levels of resolution (zoom), as set forth below in Table A. Thus, a single A level Maplet represents a 0.05×0.05 degree grid area; a single B level Maplet represents a 0.5×0.5 degree grid area; a single C level Maplet represents a 5×5 degree grid area; a single D level Maplet represents a 50×50 degree grid area and a single E level Maplet represents the entire world in a single Maplet. It is understood that Table A is only an example of a particular Maplet grid configuration; other or different grid configurations may also be developed. A Maplet comprises of a set of layers, with each layer containing a set of DEntries, and each DEentry containing a set of points.

TABLE A

| Level | Grid (degrees) | # of Maplets to cover the World | # of Maplets to cover North America | # of Maplets to cover Europe |
|---|---|---|---|---|
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

Figure 3B:
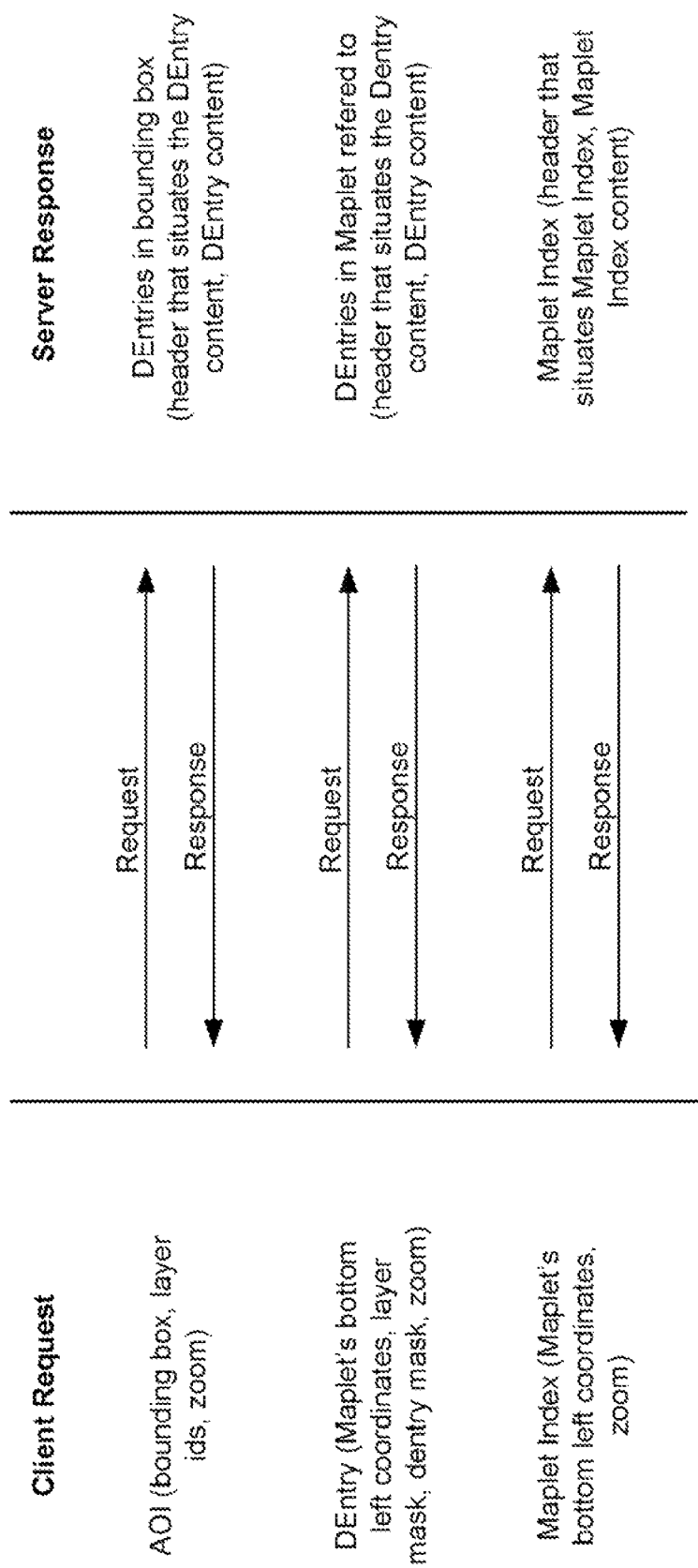
FIG. 3B illustrates a message exchange between a mobile communication device and a mapping server for downloading map content to the mobile communication device based on the system of FIG. 3A.

Turning now to FIG. 3B, three specific types of requests may be generated by a mobile communication device (i.e. the client)—AOI requests, DEntry requests, and Maplet Index requests. The requests may be generated separately or in various combinations, as discussed in greater detail below. An AOI (area of interest) request calls for all DEntries in a given area (bounding box) for a predetermined or selected set of z-order layers. The AOI request is usually generated when the mobile communication device moves to a new area so as to fetch Dentries for display before the device client knows what is available in the Maplet. The Maplet Index has the exact same structure as a Maplet but does not contain complete DEntries (i.e. the data Points that actually represent artifacts and labels are omitted). Thus, a Maplet Index defines what layers and DEntries are available for a given Maplet. A data or DEntry request is a mechanism to bundle together all of the required DEntries for a given Maplet.

Typically, AOI and Maplet Index requests are paired together in the same message, although they need not be, while DEntry requests are generated most often. For example, when the mobile communication device moves into an area in connection with which no information has been stored on the device client, the Maplet Index request returns a Maplet Index that indicates what data the client can specifically request from the server 321, while the AOI request returns any DEntries within the area of interest for the specified layers (if they exist). In the example requests shown in FIG. 3B, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

According to the present disclosure herein, a collection of 20×20 A-level Maplets (representing a 1×1 degree square) is compiled into a Maplet file (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
| --- | --- | --- |
| 0x000 | Maplet # 0 Offset (4 bytes) | Maplet # 0 Length (4 bytes) |
| 0x008 | Maplet # 1 Offset | Maplet # 1 Length |
| 0x010 | Maplet # 2 Offset | Maplet # 2 Length |
| ... | ... | ... |
| 0xC78 | Maplet # 399 Offset | Maplet # 399 Length |
| 0xC80 | | Beginning of Maplet # 0 |
| 0xC80 + Size of Maplet # 0 | | Beginning of Maplet # 1 |
| 0xC80 + Size of Maplet # 0 + # 1 | | Beginning of Maplet # 2 |
| ... | | ... |
| 0xC80 + Σ of Size of Maplets (# 0:# 398) | | Beginning of Maplet # 399 |

In Table B, the offset of Maplet #0 is 0x0000_0000 since, according to the present disclosure, the data structure is based on the assumption that the base address for the actual Maplet data is 0x0000_0C80. Therefore the absolute address for Maplet #0 data is: Maplet #0 Address=Base Address (0x0000_0C80)+Maplet #0 Offset (0x0000_0000), and additional Maplet addresses are calculated as: Maplet #(n+1) Offset=Maplet #(n) Offset+Maplet #(n) Length. If a Maplet has no data or does not exist, the length parameter is set to zero (0x0000_0000).

TABLE C

| Address Offset | Offset (4 bytes) | Length (4 bytes) |
| --- | --- | --- |
| 0x000 | Maplet Index # 0 Offset | Maplet Index # 0 Length |
| 0x008 | Maplet Index # 1 Offset | Maplet Index # 1 Length |
| 0x010 | Maplet Index # 2 Offset | Maplet Index # 2 Length |
| ... | ... | ... |
| 0xC78 | Maplet Index # 399 Offset | Maplet Index # 399 Length |
| 0xC80 | | Beginning of Maplet Index # 0 |
| 0xC80 + Size of Maplet Index # 0 | | Beginning of Maplet Index # 1 |
| 0xC80 + Size of Maplet Index # 0 + # 1 | | Beginning of Maplet Index # 2 |
| ... | | ... |
| 0xC80 + Σ of Size of Maplet Indices(# 0:# 399) | | Beginning of Maplet Index # 399 |

In Table C, the offset of Maplet Index #0 is 0x0000_0000 since, according to the present disclosure the data structure is based on the assumption that the base address for the actual Maplet index data is 0x0000_0C80. Therefore the absolute address for Maplet Index #0 data is: Maplet Index #0 Address=Base Address (0x0000_0C80)+Maplet Index #0 Offset (0x0000_0000), and additional Maplet index addresses are calculated as: Maplet Index #(n+1) Offset=Maplet Index #(n) Offset+Maplet Index #(n) Length. If a Maplet Index has no data or does not exist, the length parameter is set to zero (0x0000_0000).

Figure 3C:
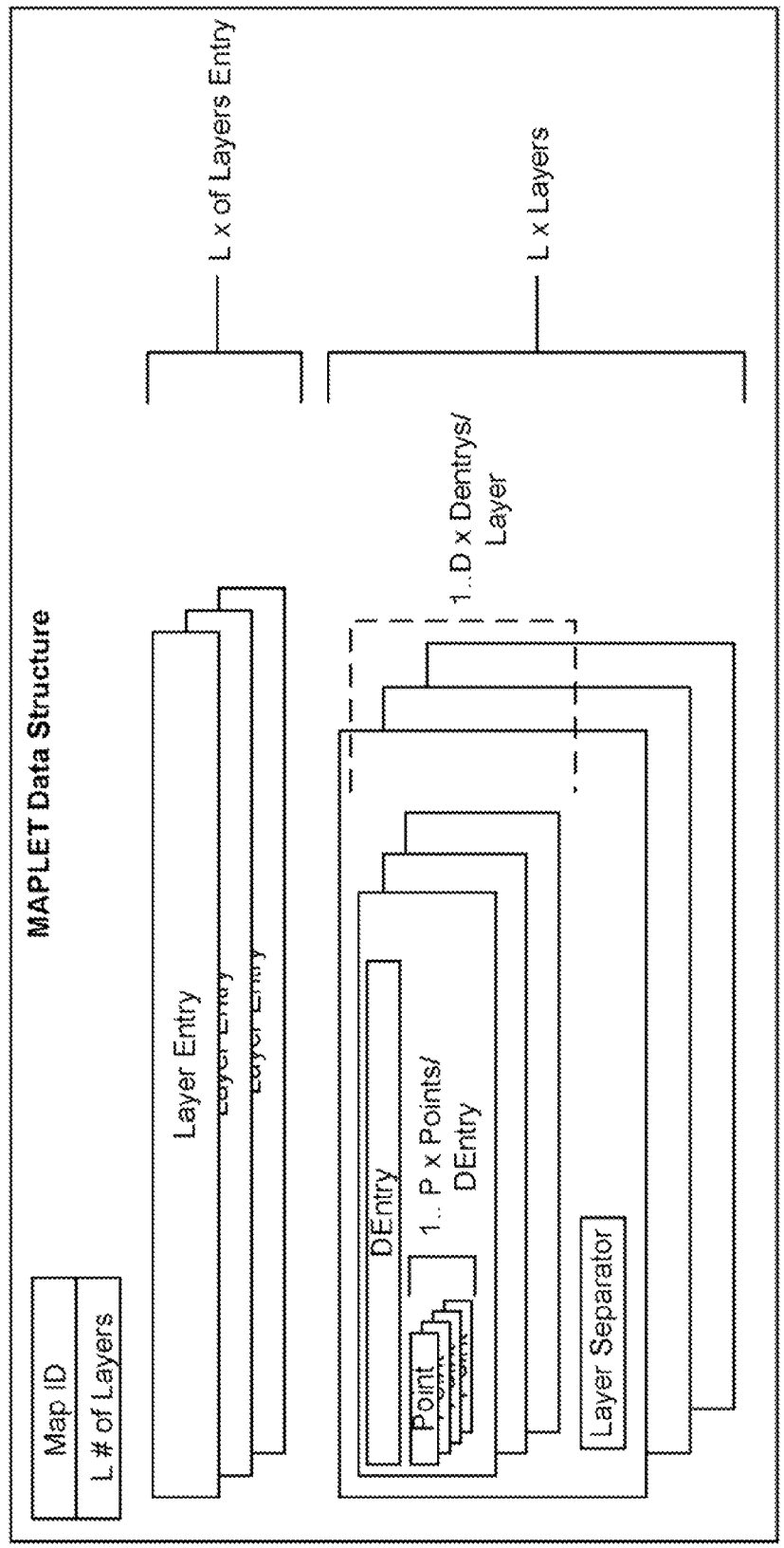
FIG. 3C is a diagram showing a Maplet data structure according to an exemplary embodiment.

FIG. 3C and Table D below, in combination, illustrate an exemplary embodiment of a basic Maplet data structure. Generally, as noted above, the Maplet data structure can be said to include a Maplet Index (ie an index of the DEntries, each of which representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. Each Layer Entry defines rendering attributes for all DEntries in the corresponding Layer and is followed by a list of DEntries for that Layer. The above forms a Maplet Index. For a complete Maplet, each DEntry contains a set of data Points (referred to herein as oPoints) or Labels). Note that Layers may have multiple DEntries and the complete list of DEntrys and Points are grouped by Layer and separated by a Layer Separator (e.g. hex value 0xEEEEEEEE). According to an exemplary embodiment, each Layer Entry is 20 bytes long, and a DEntry is 12 bytes long. However, the number of Layers, number of DEntries per Layer and the number of Points per DEntry depends on the map data and is variable.

Table D provides a high "byte-level" description of a Maplet.

TABLE D

| Data | Quantity | Total # of Bytes |
|---|---|---|
| Map ID | 1 | 4 bytes |
| # of Layers | 1 | 4 bytes |
| Layer Entrys | # of Layers | 20 bytes × (# of Layers) |
| DEntry of a Layer | # of Layers × (# of DEntries in a Layer) | 12 bytes × (Σ of the # of DEntrys in each Layer) + |
| Points for DEntry of a Layer | | 4 bytes × (Σ of the # of Points in each DEntry in each Layer) + |
| Layer Separator | | 4 bytes × (# of Layers) |

For even greater detail if desired, this application hereby incorporates by reference herein a U.S. provisional patent application entitled "Method And System For Distribution Of Map Content To Mobile Communiction Devices" having Ser. No. 60/787,541, lead inventor Eric Johnson, and a filing date of 31 Mar. 2006.

Figure 4:
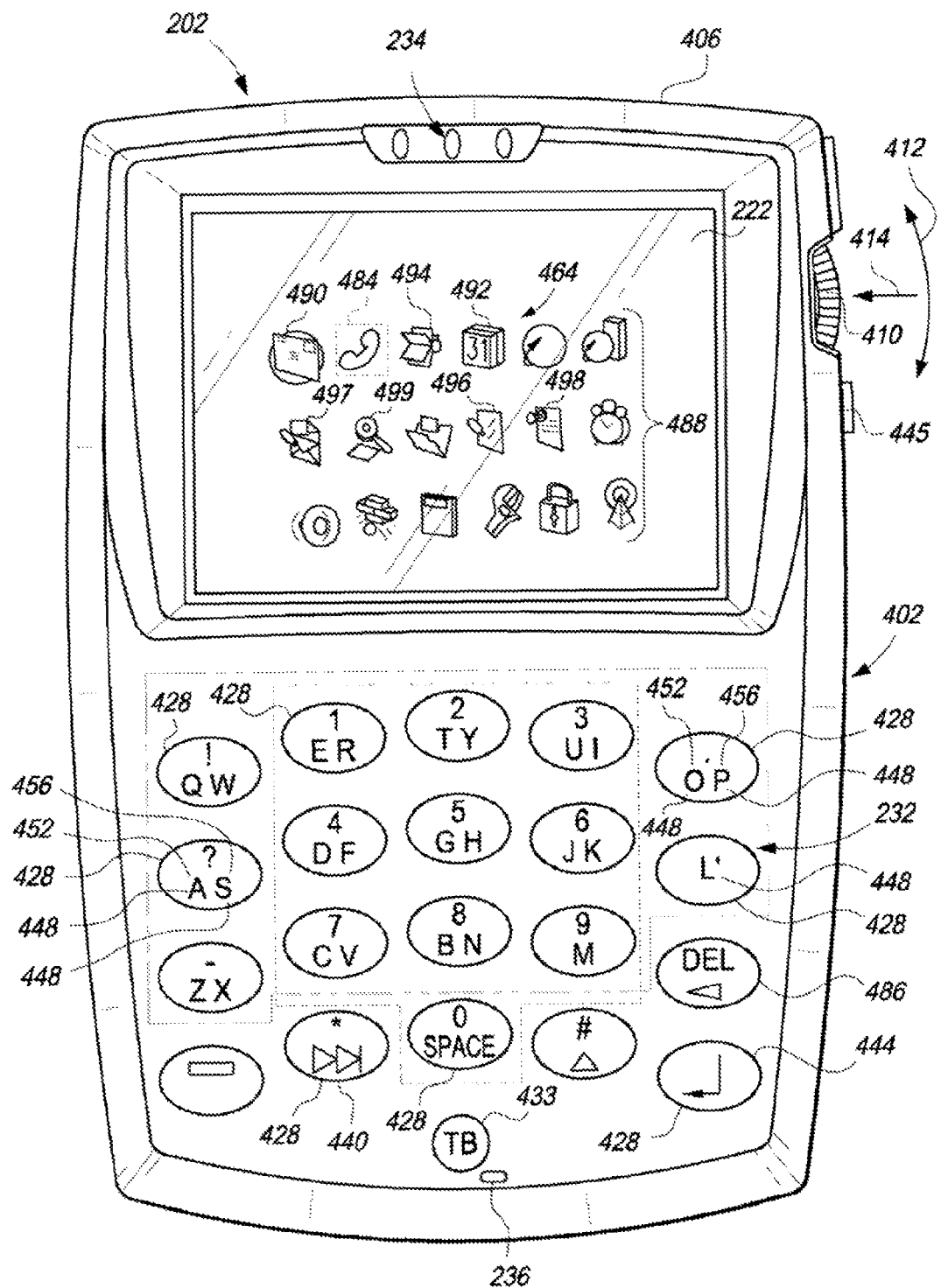
FIG. 4 is an illustration of a user interface of the mobile communication device.

FIG. 4 is an example of a user interface 402 of mobile station 202 which includes at least display 222, keyboard 232, speaker 234, microphone 236, and a cursor or view positioning mechanism such as a positioning wheel 410 (e.g. a scrollwheel wheel) or a trackball 433. Although shown enlarged in FIG. 4 for clarity, this mobile station 202 is sized to be a handheld portable device. As an alternative to or in addition to positioning wheel 410 and/or trackball 433, a wide range of one or more pointing or cursor/view positioning mechanisms such as a touch pad a joystick button, a mouse, a touchscreen, a tablet, or other whether presently known or unknown, may be employed. As employed herein, the term "cursor" shall expressly include, but not be limited by, a pointer, a movable item or other visual cue (e.g., without limitation, a graphical object; a special symbol; an outline; a rectangle; an underline character; a blinking item) used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. It is understood that the expression "characters" shall broadly be construed to include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, whether presently known or unknown, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor. Positioning wheel 410 will be described in more detail in relation to FIGS. 6 and 7 below.

Display 222 may include a cursor 484 that depicts generally where the next input or selection from user interface 402 will be received. Display 222 is shown in FIG. 4 as displaying a home screen that represents a number of applications 586 (see also FIG. 5 which shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
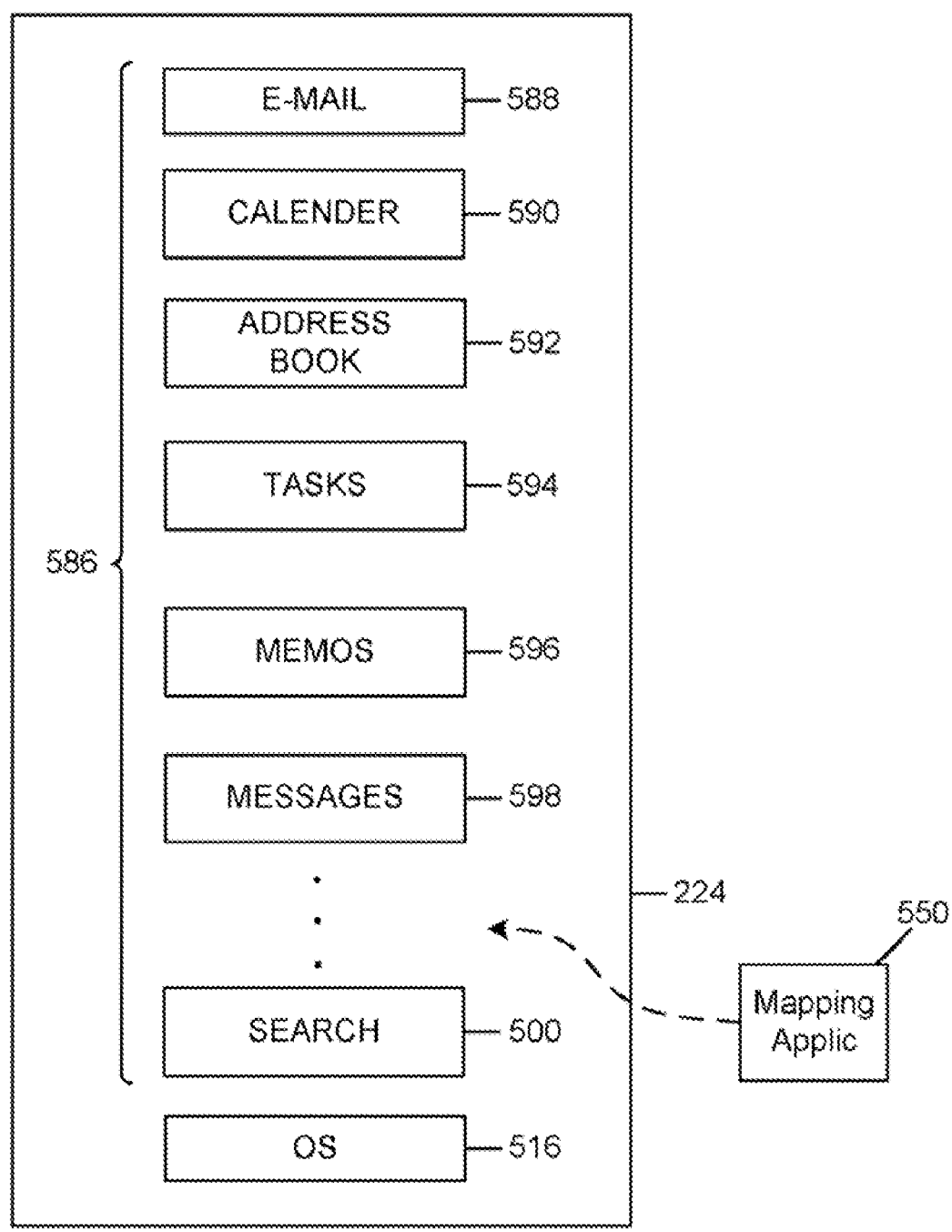
FIG. 5 is an illustration of various software applications which may reside in the mobile communication device.

As shown in FIG. 5, memory 224 includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Messages application 598 (FIG. 5) associated with Message icon 497 (FIG. 4), and a Search application 500 (FIG. 5) associated with Search icon 499 (FIG. 4). An operating system (OS) program 516 also resides in memory 224. The mobile station of the present disclosure is also adapted to render visual maps in its visual display, and utilizes a mapping application 550 stored in memory 224 to facilitate map rendering and related functionality.

In FIG. 4, the "home" screen output is currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 33 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222, and since information and messages are typically only partially presented in the limited view of display 222 at any given moment. As previously described, positioning wheel 410 is one helpful cursor/view positioning mechanism to achieve such movement. Positioning wheel 410, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Figure 6:
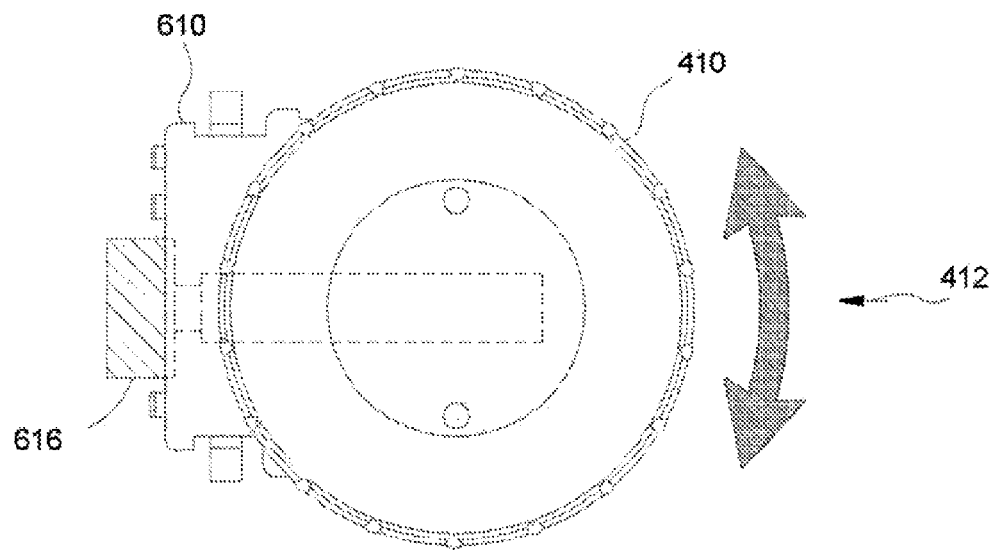
FIGS. 6 and 7 are illustrations of a positioning wheel of the mobile communication device.
Figure 7:
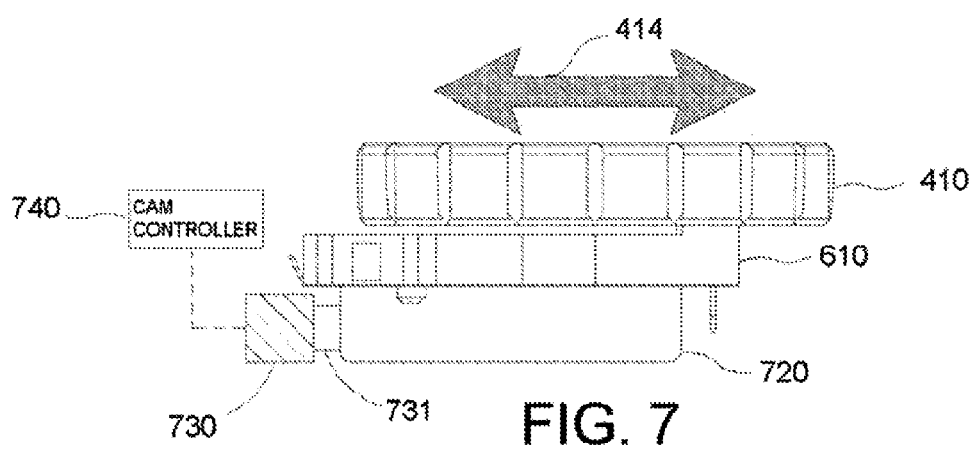

A more detailed mechanism for positioning wheel 410 is now described in relation to FIGS. 6 and 7. Positioning wheel 410 of FIGS. 6-7 is shown connected to and rotatable about a body assembly 610. Body assembly 610 may be connected to or be part of a slide assembly 720. Slide assembly 720 allows the entirety of positioning wheel 410 and body assembly 610 may move freely laterally 414 with respect to the handheld device. Lateral positioning wheel movement 414 is defined as movement along a plane normal to the rotational axis of positioning wheel 410. To control this lateral movement 414, slide assembly 720 may be connected to a control mechanism such as a cam mechanism 730 with a cam 731, or alternatively a level mechanism, a solenoid mechanism, or some other actuating means. Cam mechanism 730 is connected to a cam controller 740 responsible for controlling a lateral position of positioning wheel 410. As cam 731 connected to cam mechanism 730 and slide assembly 720 moves, positioning wheel 410 and body assembly 610 accordingly move laterally. Such lateral movement inwards toward the housing is detectable by the processor of the mobile station as a switch input (actuation or depression of the positioning wheel key).

Although positioning wheel 410 has been shown and described as one mechanism for use in navigating and moving through visually displayed information, any suitable mechanism may be utilized for the present user interface techniques, such a trackball; UP, DOWN, LEFT, and RIGHT keys; a mouse and cursor mechanism; or a touch screen display mechanism.

FIG. 8 is an illustration of information which may be displayed in the display 222. In this embodiment, the information displayed in FIG. 8 is an address book contact 800 of an address book which may be displayed in display 222 from use of Address book application 592 (FIG. 5). The address book is for use in organizing a plurality of address book contacts for the end user. This address book contact information 800 may be viewable after opening the Address Book application from the home screen page. In the example of FIG. 8, address book contact information 800 includes an address book name 802 in an address book name field, a business or work telephone number 804 in a business or work telephone number field, a home telephone number 805 in a home telephone number field, a business or work address 806 in one or more business or work address fields, and a home address 808 in one or more home address fields. Other information may include a company name (e.g. Company, Inc.) in a company name field, a title or position of the end user in the company, and a Personal Identification Number (PIN) in a PIN field. Each address book contact of the address book has a plurality of the same fields for organizing such information. Some field of any address book contact may remain empty, depending on the end user and/or the availability of information to the end user. The end user typically manually enters address book contact information for each contact into storage of memory for subsequent use in facilitating communications. Alternatively or additionally, address book contact information may be downloaded or otherwise received in the device in a non-manual fashion. Additional location information for the address book contact information 800 may be included, such as a real-time location of a mobile communication device associated with the selected address book contact received through the wireless transceiver. This location may be in the form of a real-time position address or real-time latitude and longitude coordinates, and may be received substantially in real-time by the mobile communication device.

In addition to providing one or more user applications for the end user as previously described, the mobile station of the present disclosure is also adapted to render visual maps in its display 222. Referring back to FIG. 5, a mapping application 550 is provided in memory 224 of the mobile station for rendering of visual maps in the display. Map rendering may be performed substantially as described in relation to FIG. 3 where the mobile station sends requests for map rendering data to the network with address and/or latitude and longitude coordinates as input, subsequently receiving the map rendering data which it uses to render a map in the visual display. Map rendering data may be cached and maintained in memory over time. Alternatively, map rendering may be performed by retrieving "bitmaps" of the maps and visually displaying these bitmaps corresponding to the address and/or latitude and longitude coordinates.

Figure 9:
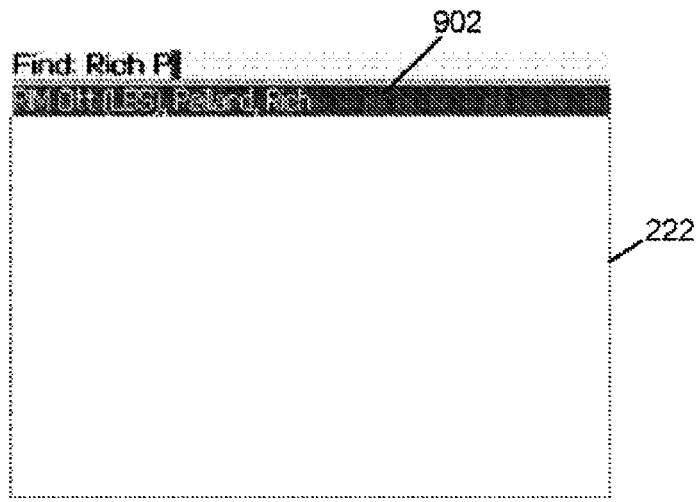
FIG. 9 is an illustration of a listing of the address book contact of FIG. 8.
Figure 10:
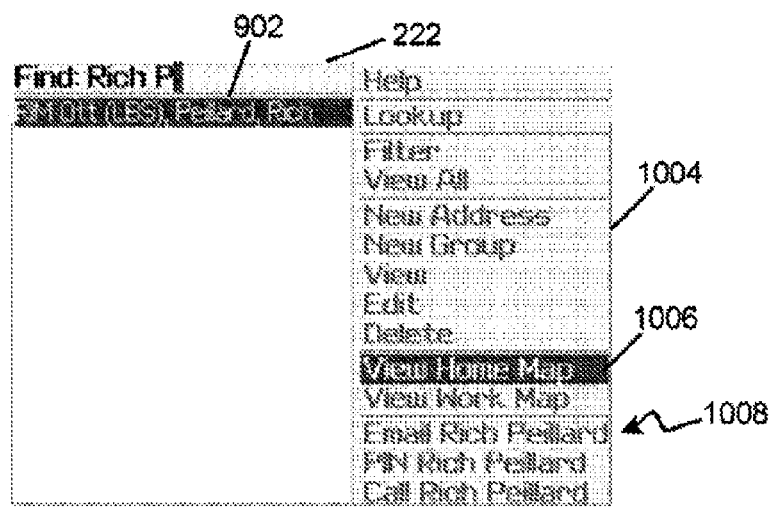
FIG. 10 is an illustration of the listing of the address book contact of FIG. 9, where a menu of functions which includes a map function may be invoked to display a map associated with the address book contact, an example of such map being generally shown later in FIGS. 13-14.

As an example of one way in which the displaying of a map may be initiated, FIG. 9 is an illustration of a listing 902 of the address book contact of FIG. 8. In FIG. 10, it is shown that a pop-up or pull-down menu 1004 with a plurality of function identifiers 1008 may be displayed in association with the listing 902 of the address book contact. The plurality of function identifiers 1008 includes a map function identifier 1006 (e.g. "View Home Map") which may be selected by the end user to cause the mapping application to be called so that a map associated with the address book contact to be displayed. One example of such map(s) is shown and described later in relation to FIGS. 13-14.

Note that the positioning mechanism (e.g. the positioning wheel of FIGS. 4, 6, and 7) of the mobile station may be used by the end user to select this map function identifier 1006, as well as any other function identifier 1008, from menu 1004 in FIG. 9. Specifically, the listing 902 of the address book contact is selected by the end user by depressing or actuating the positioning wheel while the listing 902 is highlighted in FIG. 9, which causes menu 1004 to appear in display 222 as shown in FIG. 10. Subsequently, a cursor may be scrolled up and/or down through function identifiers 1008 of menu 1004 by the end user by rotating the positioning wheel in an upwards and/or downwards direction. By rotating the positioning wheel, the cursor may be positioned over map function identifier 1006 ("View Home Map"), which causes the function identifier to be highlighted as shown in FIG. 10. While map function identifier 1006 is highlighted, map function identifier 1006 is invoked by the end user by depressing or actuating the positioning wheel. Thus, the positioning wheel may be used to scroll, navigate, and select functions in the mobile station as described. More generally, the positioning wheel may be used to scroll, navigate, and select through files, messages, and other information stored in the mobile station.

The present techniques of the disclosure utilize network-maintained map data sets for mobile communication devices which are stored in a network database and managed by one or more network servers. Initially, a mobile communication device must request and retrieve the map data from the network database over the wireless communication network and store the map data in a memory cache. The processor subsequently utilizes the map data in its cache to render maps in the visual display of the device. Subsequently, any map data not found within the cache (typically the case when the location or region of the map substantially changes) needs to be similarly requested and retrieved from the network database. However, the network database may be updated over time with one or more different versions of map data. This updating may be performed regularly over time when new or alternative map information is made available; the updates may be important corrections to errors or updated visual or textual features, for example. If an alternative version of the map data is made available to all mobile communication devices in the wireless communication network at substantially the same time, and the alternative version replaces the previous version in the network database, then the mobile communication devices may render maps which are inconsistent due to the inconsistencies between the previous version of map data in its cache and the updates it receives. If the alternative version of the map data is made available and required to be utilized in full by the mobile communication devices (i.e. full download to replace all map data in its cache), then the wireless communication network would be overburdened with high volumes of map data traffic at the same time. Also, a mobile communication device would perhaps be (unwittingly) utilizing bandwidth that it might not have wanted to utilize, and may undesirably require the end user of the device to bear the costs of the extra bandwidth usage.

Figure 11:
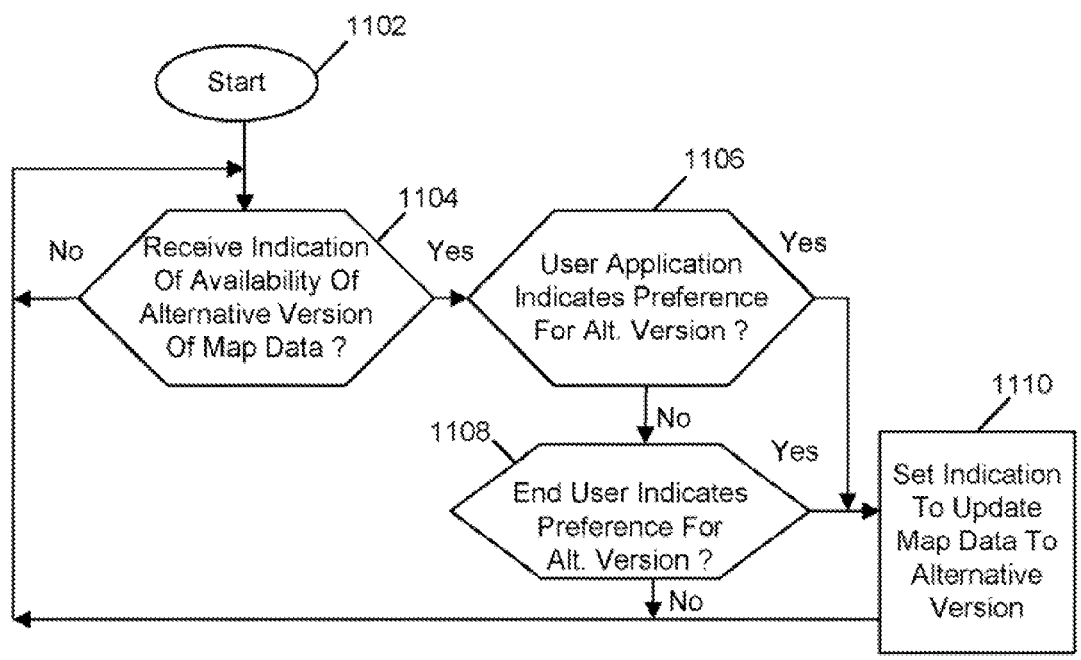
FIGS. 11-12 are flowcharts which help describe a map version control method for use in updating the use of network-maintained map data sets in mobile communication devices.
Figure 12:
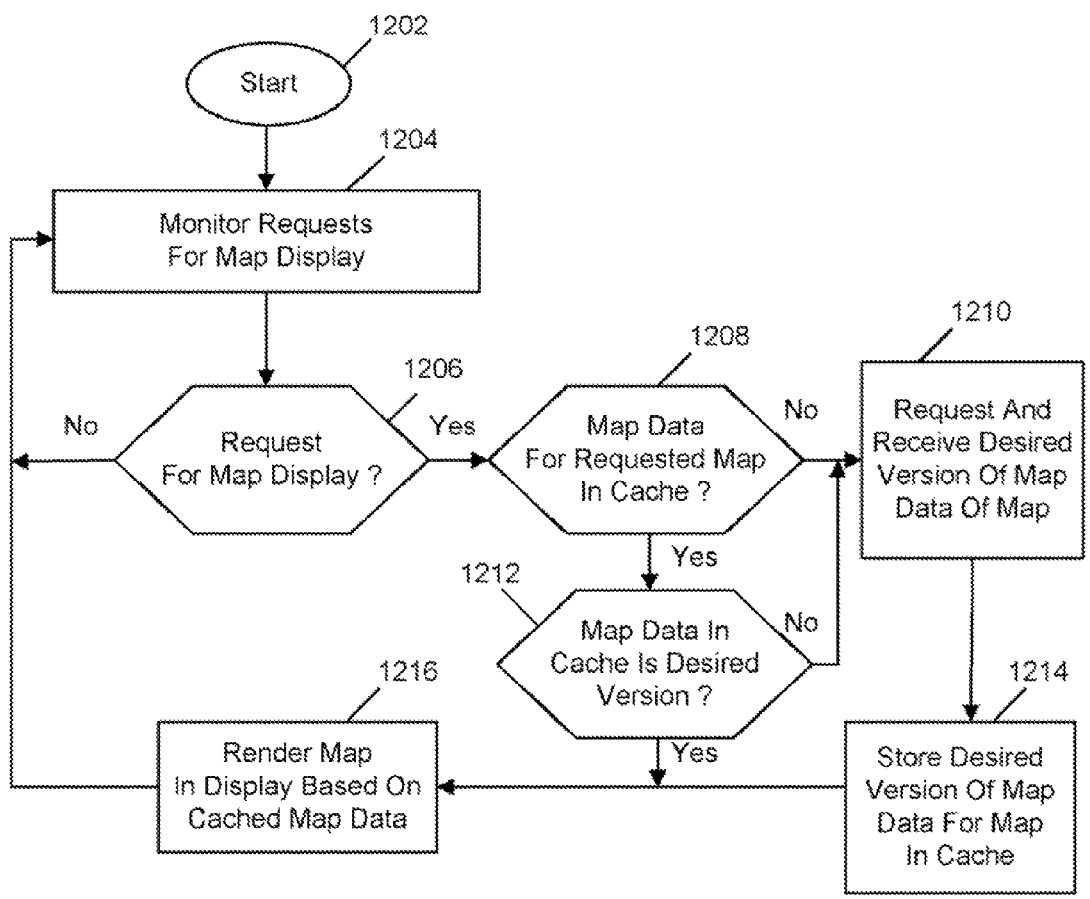

FIGS. 11-12 are flowcharts which help describe a map version control method for use in updating the use of network-maintained map data sets. The method is performed by a mobile communication device as described in relation to the previous figures, or alternatively by any computer or communication device (e.g. a PC). The method may be executed by one or more processors of the communication device. A computer program product for the mobile station may include computer instructions stored on a computer readable-medium (memory, a floppy disk or CD-ROM) which are written in accordance with the described logic of this method.

In general, the processor utilizes a version of map data to render maps in the visual display. This version of the map data is maintained in a memory cache of the communication device. Primarily, the version of map data in the cache is utilized for rendering the maps by the communication device, especially when the location or region of the map requested remains substantially the same or does not dramatically change. Initially, no map data is stored in the cache and the processor must request and retrieve the map data from a network database (maintained by a network server) over the wireless communication network. Thereafter, any map data not found within the cache (typically the case when the location or region of the map substantially changes) needs to be similarly requested and retrieved from the network database. When such additional map data is needed from the network database, the processor causes one or more requests for the map data to be sent to the network server over the wireless communication network and receives the map data from the network database in response.

Beginning at a start block 1102 of FIG. 11, the communication device identifies whether it has received any indication that an alternative version (e.g. an upgraded version) of map data is available in the network database (step 1104 of FIG. 11). This indication is received in a message over the wireless communication network from the network server when the alternative version of the map data is available. The indication of availability may be viewed as an offer to utilize the alternative version. The processor continues to monitor for such indications during its steady-state operation when no such indication is identified immediately. If such an indication is received at step 1104, then the processor identifies whether one of the applications of the communication device indicates a preference to utilize the alternative version of the map data (step 1106 of FIG. 11). This application may be the mapping application of the communication device, or one of the other applications which may require the most recent version of data. The preference indicator may be one that is a programmable preference indicator or stored configuration setting for the application, which may be programmable by the end user through the user interface.

If the application does not indicate a preference in step 1106, then the processor identifies whether an end user indicates a preference for the alternative version of the map data (step 1108 of FIG. 11). For step 1108, when the indication of the alternative version of the map data in step 1104 is received over the wireless communication network, the processor causes or triggers an indication of the availability of the alternative version of the map data to be presented in the display for the end user. The presentation may be in the form of a message directed to the communication device in one of its applications (e.g. an e-mail message in the e-mail application, or a general message in the message application), or alternatively may be in the form of a "pop-up" window in the display, for example. The presentation may include a user input prompt in the display to which the end user responds with an acceptance or a declination (e.g. via an actuation of a button, key, or switch of the user interface) to utilize the alternative version in step 1108. If an acceptance which indicates the user's preference to utilize the alternative version is identified at step 1108, then an update indication to update the map data to the alternative version is set in memory (step 1110 of FIG. 11). If a declination which indicates the user's preference to decline the use of the alternative version is identified (i.e. to continue utilizing the current version), then the update indication which indicates the user's preference to decline the use of the alternative version is not set in memory. Note that a declination may include the case where the end user refrains from accepting or acting upon the notice of the availability of the alternative version, or refrains from accepting or acting upon the notice of the availability of the alternative version within a predetermined time period. Alternatively, or additionally, an update refrain indication may be set in memory to reflect the user's preference to refrain from updating to the current version.

Note that, although both an application preference and an end user preference was tested for in the flowchart of FIG. 11 (steps 1106 and 1108, respectively), only a single test may be performed in the device. That is, one of these test steps may be optional. Preferably, either one or both of these tests (steps 1106, 1108) are settable or programmable in the device by either the end user through the user interface or by the manufacturer or service provider.

The acceptance or declination of any received indication of availability for the alternative version of map data may be used in the decision-making process of the processor when rendering maps in the display of the communication device. Moving on to the flowchart of FIG. 12 at a start block 1202, the processor of the communication device monitors for the receipt of requests for the visual display of a map (step 1204 of FIG. 12). If a request for a map display is received at step 1206, then the processor identifies whether map data for the requested map to be rendered is already stored in the cache (step 1208 of FIG. 12). If the map data is already stored in the cache as identified in step 1208, then the processor identifies whether the map data for the requested map stored in the cache is the proper, desired version (step 1212 of FIG. 12). The proper desired version may be the current version or the alternative version of the map data depending on the outcome of the events that occurred in relation to the flowchart of FIG. 11. In step 1212, the processor may utilize the update indication stored in memory to identify whether the map data stored in the cache is the proper, desired version. If the map data in the cache is already indeed the proper, desired version (i.e. whether the current or alternative version), then the processor simply utilizes the map data in the cache for rendering the map in the display (step 1216 of FIG. 12), without receiving any map data from the network database over the wireless communication network.

If the map data in the cache is not of the proper, desired version in step 1212, or map data for the location of the map is not identified in the cache in step 1208, then the processor causes one or more requests for the map data to be sent to the network server over the wireless communication network and receives the map data from the network database in response (step 1210 of FIG. 12). The processor requests the map data of the proper, desired version, whether it is the current version or the alternative version. The processor then stores this map data in its cache (step 1214). The processor then utilizes the map data in the cache for rendering the map in the display (step 1216 of FIG. 12).

Preferably, the techniques performed in relation to FIG. 11 and/or FIG. 12 may utilize version numbers of the map data to provide better control. Using such a technique, the map data received and stored in the memory cache may also include a version number embedded therein which identifies the version of the map data. In addition, when the indication indicating that the alternative version of the map data is available is received in step 1104 of FIG. 11, a version number of the alternative version of the map data may be received along with it (without any map data of the alternative version). The processor operates to compare the version number of the alternative version and the version number of the current version in the memory cache. Based on the comparison, if the version number of the alterative version of the map data is greater than the version number of the version of the map data (i.e. indicating a desired or updated version), for example, then the processor operates to continue performing subsequent steps for obtaining the alternative version of the map data (e.g. performs steps 1106 and/or 1108 of FIG. 11). If the version number of the alternative version of the map data is less than or equal to the version number of the version of the map data (i.e. indicating the same or other version), however, then the processor operates to refrain from performing subsequent steps to obtain the alternative version (e.g. refrains from performing steps 1106 and 1108 of FIG. 11). Alternatively, or additionally, this version number comparison step may be utilized as the test in step 1212 of FIG. 12 in lieu of or in addition to the previously described details of step 1212.

Note that when the alternative version of the map data is subsequently requested and received by the mobile communication device (if at all), the version number of the alternative version is embedded in the map data as well. As apparent, the updating process may repeat on an ongoing or regular basis for a second, third, fourth, etc. alternative (updated) versions of the map data in the same fashion.

The mapping server operates in a correspondingly similar manner to the operation of the mobile communication device described in relation to FIGS. 11-12. The mapping server maintains storage of the version of map data in one or more network databases and causes the version of map data to be sent from the one or more network databases to the mobile communication device via the wireless network, so that the mobile device may visually display a map based on the version of the map data. Later in time, the mapping server maintains storage of an alternative (e.g. updated) version of the map data in the one or more network databases while maintaining storage of the version of the map data. Sometime after the alternative version of the map data is made available, the mapping server causes an indication (or indication message) of the alternative version of the map data to be transmitted to the mobile communication device via the wireless communication network.

The mobile communication receives this indication or indication message from the mapping server. If the mobile communication accepts the alternative version of the map data, then the mapping server will subsequently receive one or more requests for the alternative version of the map data via the wireless communication network and cause the alternative version of the map data to be sent to the mobile communication device via the wireless communication network in response to the one or more requests. If the mobile communication device refrains from accepting the alternative version, then the mapping server will continue to refrain from causing the alternative version of the map data to be sent to the mobile communication device via the wireless communication network. Preferably, the version of the map data to be sent to the mobile communication device includes a version number of the version of map data, and the indication sent to the mobile communication device includes a version number of the alternative version of map data, and used for the purposes described earlier above.

Preferably, the version number utilized for these purposes is included at the Maplet level of the Maplet data structure (refer to earlier discussion in relation to FIGS. 3A, 3B, and 3C). Specifically, the Map ID of a Maplet may be utilized as the version number for the data. As an alternative, the version number may be additionally or alternatively included at the DEntry or Layer level of the Maplet data structure. When alternative or updated versions of map data are available, they may only alter or affect one or more particular layers, objects, location area, etc. and not the entire set of map data. As apparent, when receiving alternative or updated versions of map data, the mobile communication device may request and receive alternatives or updates of only the one or more particular layers, objects, etc. for the current location and not the entire set of map data for the current location. Such technique is a more efficient use of resources and bandwidth, especially in light of many mobile devices being in operation at any given time.

Figure 13:
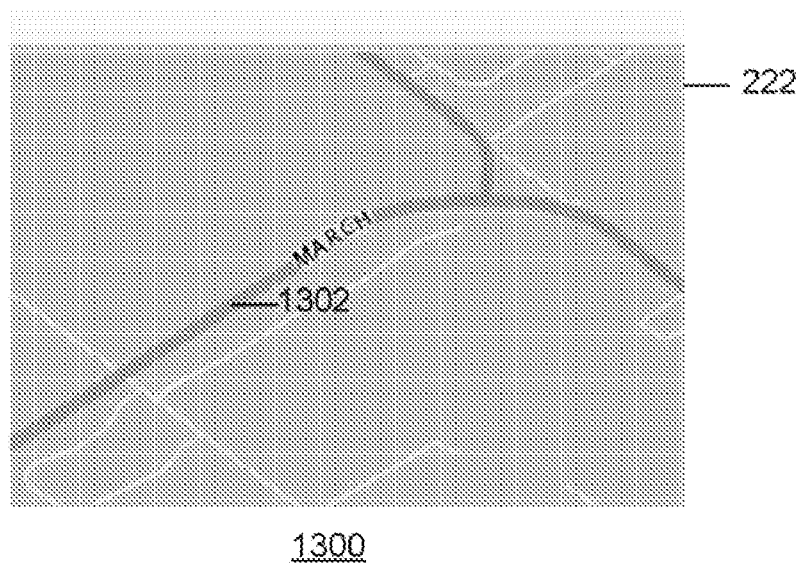
FIG. 13 is an example of a view of a map of a specified location, which has been rendered based on a version of a map data set maintained in a network database.
Figure 14:
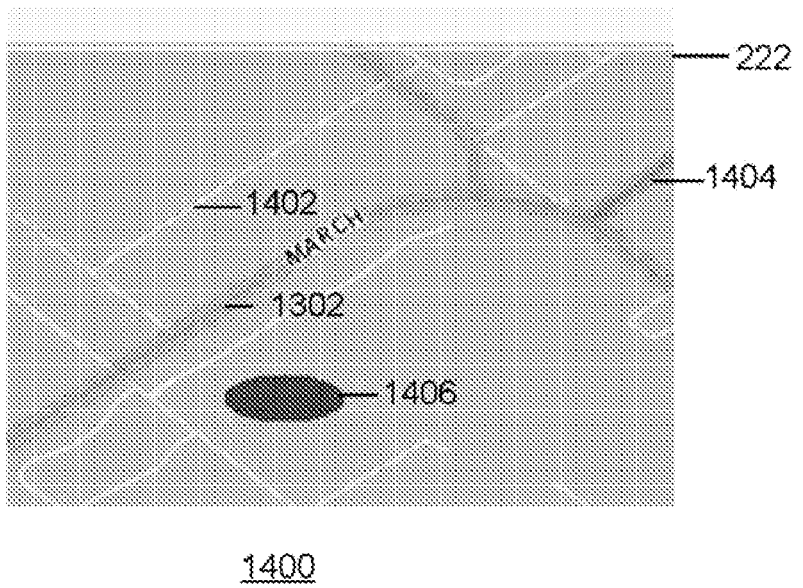
FIG. 14 is an example of a view of the map at the same specified location as FIG. 13, which has been rendered based on the alternative or updated version of the map data set maintained in the network database.

For an exemplary comparative visual illustration of different map versions, FIGS. 13 and 14 are example views 1300 and 1400, respectively, of maps which have been rendered in the display 222 of the mobile communication device based on a current version (FIG. 13) and an alternative version (FIG. 14) of map data. As apparent, the maps in views 1300, 1400 correspond to the same location but they have different appearances. As shown in view 1300 of FIG. 13, the map has one of more map objects, such as a map object 1302 corresponding to a road. Each map object may be associated with a map object label, such as a map object label corresponding to the name of the road (e.g. "March Road"). The map objects may be or include other objects such as a park, river, ocean, or lake which may be tagged or labeled with map object labels such as the name of the road, the park, the river, the ocean, or the lake associated with the map object.

The view 1400 of FIG. 14 is similar or substantially the same as the view 1300 of FIG. 13. However, view 1400 has an appearance that is different from the appearance of view 1300. In this example, the map of FIG. 14 has one or more map objects that are unavailable in the map of FIG. 13. The difference in appearances reflect the updated nature of the alternative version of the map data. In this example in particular, the map of FIG. 14 includes a map object 1402 corresponding to a new path (unavailable in FIG. 13), a map object 1404 corresponding to a new road (unavailable in FIG. 13), and a map object 1406 corresponding to a pond 1406 (unavailable in FIG. 13) which has been recently entered in the network database.

Thus, version control methods and apparatus for updating the use of network-maintained map data sets for mobile communication devices have been described. An illustrative method for a mobile communication device may include the steps of receiving a version of map data from a network database through a wireless communication network; causing the map to be visually displayed in a display in accordance with the version of the map data; maintaining storage of the version of the map data in a cache; receiving, through the wireless communication network, an indication indicating that an alternative or updated version of the map data corresponding to the map is available in the network database; identifying, at the mobile communication device, one of an acceptance and a declination of the alternative version of the map data; and if the acceptance is identified: causing one or more requests for the alternative version of the map data to be sent through the wireless communication network, receiving the alternative version of the map data through the wireless communication network in response to the one or more requests, and causing the map to be visually displayed in the display in accordance with the alternative version of the map data; and if the declination is identified: refraining from causing one or more requests for the alternative version of the map data to be sent through the wireless communication network and continuing to cause the map to be visually displayed in the display in accordance with the version of the map data. The map corresponding to the alternative version of the map data may include one or more map objects that are unavailable in the map of the other version or have an appearance that is different from the appearance of the map of the other version, as examples. A mobile communication device which is adapted to perform the steps of the method may also be provided.

At the mobile communication device, a version number of the version of the map data may be received along with the map data and embedded therein, and a version number of the alternative version may be received along with the indication indicating that the alternative version is available. In this case, the method includes the further acts of comparing the version number of the alternative version of the map data and the version number of the version of the map data; if the version number of the alterative version of the map data is greater than the version number of the version of the map data (i.e. indicating that an update is available), then performing the act of identifying and subsequent acts for receiving or refraining from receiving the alternative version of the map data; and if the version number of the alternative version of the map data is less than or equal to the version number of the version of the map data, then refraining from performing the act of identifying and subsequent acts of receiving or refraining from receiving the alternative version of the map data.

An illustrative method for a network mapping server may include the steps of maintaining storage of a version of map data in one or more network databases; causing the version of map data to be sent from the one or more network databases to a mobile communication device via a wireless communication network, the map data corresponding to a map in the mobile communication device; maintaining storage of an alternative version of the map data in the one or more network databases while maintaining storage of the version of the map data; causing an indication to be sent to the mobile communication device via the wireless communication network, the indication indicating that the alternative version of the map data corresponding to the map is available; if the mobile communication accepts the alternative version of the map data: receiving one or more requests for the alternative version of the map data via the wireless communication network and causing the alternative version of the map data to be sent to the mobile communication device via the wireless communication network in response to the one or more requests; and if the mobile communication device refrains from accepting the alternative version: refraining from causing the alternative version of the map data to be sent to the mobile communication device via the wireless communication network. A version number of the version of the map data may be sent along with the version of the map data, and a version number of the alternative version of the map data may be sent along with the indication indicating that the alternative version of the map data is available. A network mapping server which is adapted to perform the steps of the method may also be provided. A communication system for providing the updates of network-maintained map data sets in mobile communication devices may also be provided, and include one or more such network map services, one or more network databases, a wireless communication network, and a plurality of mobile communication devices which operate in the wireless communication network.

The above-described embodiments of the present disclosure are intended to be examples only. Those of skill in the art may effect alterations, modifications and variations to the particular embodiments without departing from the scope of the invention. The invention described herein in the recited claims intends to cover and embrace all suitable changes in technology.

What is claimed is:

1. A map version control method for use in providing updates of network-maintained map data sets in mobile communication devices, the method comprising the acts of:

receiving, at a mobile communication device through a wireless communication network, one or more maplets of map data for rendering a map, each said maplet having a plurality of layers of map data received upon request from the mobile communication device, each said layer including a version number and a plurality of data entries associated therewith, each said layer being obtained from a database of a different network than another said layer, each said data entry indicating a plurality of data points for rendering one or more artifacts or labels within an area of interest of the map;

storing the map data;

causing the map of the area of interest to be rendered in a display of the mobile communication device by combining the plurality of layers of the stored map data;

receiving, through the wireless communication network, an indication indicating availability of an alternative version of one of the layers which may be different from a stored version of a corresponding layer of the stored map data;

identifying one of an acceptance and a declination of the alternative version of said layer;

comparing a version number of said layer of the alternative version with the version number included in said corresponding layer of the stored version;

if the version number of the alternative version is greater than the version number of the stored version, and the acceptance is identified: causing one or more requests for the alternative version of said layer for the area of interest to be sent through the wireless communication network, receiving the alternative version of said layer for the area of interest through the wireless communication network in response to the one or more requests, and causing the map of the area of interest to be rendered in the display in accordance with the combined plurality of layers of the stored map data but with use of the alternative version of said layer; and if the version number of the alternative version is less than or equal to the version number of the stored version, or the acceptance is identified: refraining from causing the one or more requests for the alternative version of said layer for the area of interest to be sent through the wireless communication network, and continuing to cause the map to be rendered in the display in accordance with the combined plurality of layers of the stored map data but without use of the alternative version of said layer.

2. The map version control method of claim 1, wherein the indication is presented in the form of a message and with a user input prompt for an end user response for the acceptance or the declination.

3. The map version control method of claim 1, wherein the map rendered using the alternative version of said layer includes one or more map objects that are unavailable in the map rendered using the stored version.

4. The map version control method of claim 1, wherein the map rendered using the alternative version of said layer provides one or more map objects that are unavailable in the map rendered using the stored version.

5. The map version control method of claim 1, wherein the map rendered using the alternative version of said layer provides an appearance that is different from the appearance of the map rendered using the stored version.

6. The map version control method of claim 1, further comprising:

if the acceptance is identified: storing the alternative version of said layer to replace the stored version of said corresponding layer.

7. The map version control method of claim 1, wherein the act of identifying one of an acceptance and a declination of the alternative version comprises the further acts of receiving the acceptance or declination by an end user through a user interface of the mobile communication device.

8. The map version control method of claim 1, wherein the act of identifying one of an acceptance and a declination comprises the further acts of identifying a stored configuration setting for a mapping application of the mobile communication device used for rending the maps in the visual display based on the map data.

9. The map version control method of claim 1, wherein the acts of causing the one or more requests to be sent and receiving the alternative version of said layer are performed without requesting and receiving the other layers.

10. The map version control method of claim 1, which is embodied in a computer program product comprising a computer readable medium and computer instructions stored on the computer readable medium which are executable by one or more processors of a mobile communication device for performing the method.

11. A mobile communication device, comprising:

a wireless transceiver;

one or more processors;

a cache memory coupled to the one or more processors;

a user interface which includes a visual display;

the one or more processors being operative to:

receive, via the wireless transceiver from one or more network databases, one or more maplets of map data for rendering a map, each said maplet having a plurality of layers of map data received upon request from the mobile communication device, each said layer including a version number and a plurality of data entries associated therewith, each said layer being obtained from a database of a different network than another said layer, each said data entry indicating a plurality of data points for rendering one or more artifacts or labels within an area of interest of the map;

cause the map data to be stored in the cache memory;

cause the map of the area of interest to be rendered in the visual display by combining the plurality of layers of the stored map data;

receive, via the wireless transceiver, an indication indicating availability of an alternative version of one of the layers which may be different from a stored version of a corresponding layer of the stored map data;

identify one of an acceptance and a declination of the alternative version said layer;

compare a version number of said layer of the alternative version with the version number included in said corresponding layer of the stored version;

if the version number of the alternative version is greater than the version number of the stored version, and the acceptance is identified: cause one or more requests for the alternative version of said layer for the area of interest to be sent via the wireless transceiver, receive the alternative version of the said layer for the area of interest from the one or more network databases via the wireless transceiver in response to the one or more requests, and cause the map of the area of interest to be rendered in the visual display in accordance with the combined plurality of layers of the stored map data but with use of the alternative version of said layer; and if the version number of the alternative version is less than or equal to the version number of the stored version, or the declination is identified: refrain from causing one or more requests for the alternative version of said layer for the area of interest to be sent via the wireless transceiver, and continue to cause the map to be rendered in the visual display in accordance with the combined plurality of layers of the stored map data but without use of the alternative version of said layer.

12. The mobile communication device of claim 11, wherein the indication is presented in the form of a message and with a user input prompt for an end user response for the acceptance or the declination.

13. The mobile communication device of claim 11, wherein the one or more processors are further operative to:
    if the acceptance is identified: storing the alternative version of said layer in the cache memory to replace the stored version of said corresponding layer.

14. The mobile communication device of claim 11, wherein the one or more processors are operative to identify the one of an acceptance and a declination of the alternative version by receiving the acceptance or declination by an end user through a user interface of the mobile communication device.

15. The mobile communication device of claim 11, wherein the one or more processors are operative to identify the one of an acceptance and a declination of the alternative version by identifying a stored configuration setting for a mapping application of the mobile communication device used for rending the maps.

16. The mobile communication device of claim 11, wherein the one or more processors are operative to cause the one or more requests to be sent and receive the alternative version of said layer without requesting and receiving the other layers.

17. A map version control method of providing updates of network-maintained map data sets for mobile communication devices, the method comprising:
    causing map data to be sent from a plurality of network databases to a mobile communication device via a wireless communication network in one or more maplets for use in rendering a map at the mobile communication device, each said maplet including a plurality of layers of map data communicated upon request from the mobile communication device, each said layer including a version number and a plurality of data entries associated therewith, each said layer being obtained from a network database of a different network than another said layer, each said data entry indicating a plurality of data points for rendering one or more artifacts or labels within an area of interest of the map;
    receiving an alternative version of one of the layers of the map data from one of the network databases, the alternative version being different from a stored version of a corresponding layer in the map data, said layer of the alternative version including a version number which is different from the version number associated with said corresponding layer of the map data;
    causing an indication to be sent to the mobile communication device via the wireless communication network, the indication indicating availability of the alternative version of said layer and including the version number associated therewith;
    if the mobile communication device accepts the alternative version: receiving one or more requests for the alternative version of said layer for the area of interest via the wireless communication network and causing the alternative version of said layer for the area of interest to be sent to the mobile communication device via the wireless communication network in response to the one or more requests, so that the map of the area of interest may be rendered in a display of the mobile communication device by combining the plurality of layers of the map data with use of the alternative version of said layer; and
    if the mobile communication device refrains from accepting the alternative version: refraining from causing the alternative version of said layer for the area of interest to be sent to the mobile communication device via the wireless communication network, so that the map of the area of interest may be rendered in the display of the mobile communication device by combining the plurality of layers of the map data without use of the alternative version of said layer.

18. The map version control method of claim 17, wherein the act of causing the alternative version of said layer to be sent is performed without sending other layers to the mobile communication device.

19. The map version control method of claim 17, wherein the map rendered with use of the alternative version of said layer includes one or more map objects that are unavailable in the map rendered with use of the stored version.

20. The map version control method of claim 17, wherein the map rendered with use of the alternative version of said layer provides one or more map objects that are unavailable in the map rendered with use of the stored version.

21. The map version control method of claim 17, wherein the map rendered with use of the alternative version said layer provides an appearance that is different from the appearance of the map rendered with use of the stored version.

22. The map version control method of claim 17, which is embodied in a computer program product comprising a computer readable medium and computer instructions stored on the computer readable medium which are executable by one or more processors.

\* \* \* \* \*